US012799041B2

United States Patent
(12) United States Patent
Park et al.

(10) Patent No.: US 12,799,041 B2
(45) Date of Patent: Nov. 17, 2026

(54) CERAMIC GO/PEI NANOMEMBRANE BY LAYER-BY-LAYER ASSEMBLY BASED ON COVALENT BOND USING EDC CHEMISTRY AND METHOD FOR MANUFACTURING THE SAME

(71) Applicant: Ewha University-Industry Collaboration Foundation, Seoul (KR)

(72) Inventors: Chanhyuk Park, Seoul (KR); Minju Lee, Seoul (KR); So-Youn Kim, Gyeonggi-do (KR); Min-Ju Cha, Seoul (KR); Hee-Jin Kook, Gyeonggi-do (KR)

(73) Assignee: Ewha University-Industry Collaboration Foundation, Seoul (KR)

( * ) Notice: Subject to any disclaimer, the term of this patent is extended or adjusted under 35 U.S.C. 154(b) by 0 days.

(21) Appl. No.: 17/551,737

(22) Filed: Dec. 15, 2021

(65) Prior Publication Data

US 2022/0194869 A1 Jun. 23, 2022

(30) Foreign Application Priority Data

Dec. 18, 2020 (KR) ........................ 10-2020-0178765

(51) Int. Cl.
*C04B 41/52* (2006.01)
*B01D 61/02* (2006.01)
(Continued)

(52) U.S. Cl.
CPC .......... *C04B 41/522* (2013.01); *B01D 61/027* (2013.01); *B01D 69/1214* (2022.08); (Continued)

(58) Field of Classification Search
None
See application file for complete search history.

(56) References Cited

U.S. PATENT DOCUMENTS 9,950,931 B2 * 4/2018 Gallastegui ........... C01B 32/182
10,434,476 B2 10/2019 Van Gestel et al.
(Continued)

FOREIGN PATENT DOCUMENTS

CN 112622389 A * 4/2021
EP 3597288 A1 1/2020
(Continued)

OTHER PUBLICATIONS

Parisa Sadat Parsamehr et al., Preparation of novel cross-linked graphene oxide membrane for desalination applications using (EDC and NHS)-activated graphene oxide and PEI, Desalination, vol. 468, 2019, 114079 (Year: 2019).*
(Continued)

*Primary Examiner* — Benjamin L Lebron
*Assistant Examiner* — Eric J Mccullough
(74) *Attorney, Agent, or Firm* — Hoffmann & Baron, LLP

(57) ABSTRACT

The present disclosure relates to a ceramic graphene oxide nanofiltration membrane which is high in mechanical stability while having ion removal ability by alternately stacking GO and PEI on a ceramic nanomembrane by allowing a carboxyl group (—COOH) and an amine group (—$NH_2$) to form a covalent bond in the presence of N-ethyl-N'-[3-(dimethylamino)propyl]carbodiimide hydrochloride (EDC), thereby forming an amide group (—CONH), and a method for manufacturing the same.

2 Claims, 3 Drawing Sheets

(51) Int. Cl.

| | |
|---|---|
| ***B01D 69/12*** | (2006.01) |
| ***B01D 71/02*** | (2006.01) |
| ***B01D 71/56*** | (2006.01) |
| ***B01D 71/60*** | (2006.01) |
| ***C04B 41/00*** | (2006.01) |
| ***C04B 41/45*** | (2006.01) |
| ***C04B 41/48*** | (2006.01) |
| ***C04B 41/50*** | (2006.01) |
| ***C04B 41/83*** | (2006.01) |
| ***C04B 41/87*** | (2006.01) |
| ***C04B 41/89*** | (2006.01) |

(52) U.S. Cl.

CPC ........ *B01D 71/0211* (2022.08); *B01D 71/024* (2013.01); *B01D 71/56* (2013.01); *B01D 71/601* (2022.08); *C04B 41/0072* (2013.01); *C04B 41/009* (2013.01); *C04B 41/4535* (2013.01); *C04B 41/4558* (2013.01); *C04B 41/488* (2013.01); *C04B 41/5003* (2013.01); *C04B 41/83* (2013.01); *C04B 41/87* (2013.01); *C04B 41/89* (2013.01)

(56) References Cited

U.S. PATENT DOCUMENTS

2015/0258502 A1* 9/2015 Turowski ........... B01D 71/0211
427/244
2016/0114294 A1* 4/2016 Grunlan ................. B01D 71/60
427/470

FOREIGN PATENT DOCUMENTS

| | | | |
|---|---|---|---|
| JP | 6723265 | B2 | 7/2020 |
| KR | 10-2015-0108631 | | 9/2015 |
| KR | 10-2017-0091548 | A | 8/2017 |
| KR | 10-1881922 | | 7/2018 |
| KR | 10-2019-0130814 | A | 11/2019 |

OTHER PUBLICATIONS

Qian Nan, Pei Li, Bing Cao, Fabrication of positively charged nanofiltration membrane via the layer-by-layer assembly of graphene oxide and polyethylenimine for desalination, Applied Surface Science, vol. 387, 2016, pp. 521-528 (Year: 2016).*

Hye-Weon Yu et al., "Development of Graphene Nanocomposite Membrane Using Layer-by-layer Technique for Desalination", Membrane Journal, vol. 28, No. 1, pp. 75-82, Feb. 2018, and English abstract.

* cited by examiner

CERAMIC GO/PEI NANOMEMBRANE BY LAYER-BY-LAYER ASSEMBLY BASED ON COVALENT BOND USING EDC CHEMISTRY AND METHOD FOR MANUFACTURING THE SAME

CROSS-REFERENCE TO RELATED APPLICATIONS

This application claims the priority of Korean Patent Application No. 10-2020-0178765 filed on Dec. 18, 2020, in the Korean Intellectual Property Office, the disclosure of which is incorporated herein by reference.

BACKGROUND

Field

The present disclosure relates to a ceramic graphene oxide nanofiltration membrane which is high in mechanical stability while having ion removal ability by alternately stacking GO and PEI on a ceramic nanofiltration membrane, specifically, a ceramic nanomembrane by allowing a carboxyl group (—COOH) and an amine group (—$NH_2$) to form a covalent bond in the presence of EDC, thereby forming an amide group (—CONH), and a method for manufacturing the same.

Description of the Related Art

Ceramic membranes have recently replaced polymer membranes due to their chemical/thermal/mechanical stability, low operating pressures, long service lives, bacterial resistance, ease of cleaning, etc.

In general, a separation membrane refers to a boundary layer capable of selectively separating only a specific component from among two or more components, and is classified depending on the pore size or structure of the separation membrane and the size or properties of particles to be separated.

The types of the separation membrane are divided into micro/microfiltration (MF), ultrafiltration (UF), nanofiltration (NF), and reverse osmosis (RO) filter depending on the size of pores. In general, microfiltration represents 0.1 to 10 μm, ultrafiltration represents 10 to 100 nm, nanofiltration represents 1 to 10 nm, and reverse osmosis represents 1 nm or less. (See FIG. 1)

An MF filter is a filter which may adjust turbidity and remove various bacteria. A UF filter may remove high-molecular weight organic materials or various viruses. An NF filter may sufficiently remove various polyvalent ions ($Ca^{2+}$, $Mg^{2+}$, $Fe^{3+}$, etc.) and low-molecular weight organic materials. An RO filter may finally pass only pure water by removing monovalent ions.

The membrane filtration process using a nanofiltration (NF) membrane is in the spotlight as an advanced water treatment process by having advantages in that it may maintain a relatively high membrane permeation flux compared to the reverse osmosis (RO) membrane filtration process and may remove even low-molecular weight organic materials.

A filtration membrane material mainly used in the nanofiltration (NF) membrane process is made of a polymer that is relatively inexpensive and easy to manufacture, but has a disadvantage in that it is vulnerable to high temperatures and organic solvents. In order to overcome this problem, research and technology development have been actively carried out, in recent years mainly in Japan, on various materials such as $Al_2O_3$, $TiO_2$, $ZrO_2$, etc. with respect to ceramic nanofiltration membranes made of inorganic materials that have excellent heat resistance, chemical resistance, pressure resistance, etc., and may be used semi-permanently. However, at present, ceramic membranes remain at the level of microfiltration/ultrafiltration, and ceramic nanofiltration technology has not been developed much. In particular, there is no domestic ceramic nanofiltration technology.

Currently, ceramic filtration membranes are manufactured through a manufacturing process including consolidation and firing processes using silica, clay, and alumina as raw materials. However, in order to make a nanofiltration membrane by a sol-gel process, which is generally used in manufacturing a ceramic membrane, raw materials having smaller particles than the conventional ones are required. Further, manufacturing of defect-free ceramic membranes is a very sensitive process and requires special technical cautions. Besides, there are manufacturing limitations such as requirement of excellent quality support and intermediate layer in order to manufacture the defect-free ceramic nanomembranes. For this reason, the average pore size of the ceramic filtration membrane is a situation in which it is manufactured only as a microfiltration membrane or an ultrafiltration membrane.

Recently, many studies have been conducted to manufacture the ultrafiltration membrane into a nanofiltration membrane by modifying an ultrafiltration membrane using nanomaterials such as $TiO_2$, and carbon nanotubes, (this is also rare in the case of ceramic membranes), and one of the nanomaterials used for this is graphene oxide. Graphene oxide (GO) is a two-dimensional graphene oxide sheet containing a carboxyl group, a hydroxyl group, an epoxy group, etc., is easily dispersed in water, and is easy to handle so that it is commonly used to modify the surface of the membrane, and may improve hydrophilicity, removal ability, membrane fouling resistance ability, etc. by increasing the negative charge of the membrane surface. However, there is a problem in that the removal ability is deteriorated since swelling phenomenon occurs in water due to high hydrophilicity.

A layer-by-layer assembly refers to a method of regularly stacking thin film material layers by intermolecular attraction such as electrostatic adsorption, hydrogen bonding, covalent bonding, etc. It is a method which is mainly used when coating graphene oxide on the membrane surface in order to prevent swelling phenomenon of graphene oxide.

Therefore, the ceramic nanofiltration membrane manufacturing technology has been applied up to now only on a laboratory scale, and it is difficult to commercialize it.

The inventor of the present disclosure has completed the present disclosure by finding that a ceramic graphene oxide nanofiltration membrane may be manufactured, the ceramic graphene oxide nanofiltration membrane which is high in mechanical stability while having ion removal ability by alternately stacking GO and PEI on a ceramic nanomembrane by allowing a carboxyl group (—COOH) and an amine group (—$NH_2$) to form a covalent bond in the presence of N-ethyl-N'-[3-(dimethylamino)propyl]carbodiimide hydrochloride (EDC), thereby forming an amide group (—CONH) (refer to FIG. 2).

PRIOR ART DOCUMENTS

Patent Documents (Patent Document 1) 0001) Japanese Patent No. 6723265
(Patent Document 2) 0002) Korean Patent No. 10-1881922
(Patent Document 3) 0003) European Patent Laid-Open Publication No. 3597288
(Patent Document 4) 0004) Korean Patent Laid-Open Publication No. 10-2015-0108631

Non-Patent Documents (Non-Patent Document 1) Development of graphene nanocomposite separation membrane for desalination using a layer-by-layer assembly (Membrane Journal Vol. 28 No. 1 February, 2018, 75-82)

SUMMARY

The layer-by-layer assembly by electrostatic adsorption considering graphene oxide as a polyanion form has been commonly used in the conventional graphene oxide membrane manufactured to remove ionic components in water. Polyethyleneimine (PEI) is a polycation mainly used therefor.

However, in this case, it may be easily damaged in extreme environments such as acids, alkalis, high salinity, etc. Therefore, in order to remove ions in the extreme environments, it is necessary to use a layer-by-layer assembly based on covalent bonds with higher stability.

An object of the present disclosure is to manufacture a ceramic membrane with improved chemical/thermal/mechanical stabilities, low operating pressure, long lifespan, bacterial resistance, and ease of cleaning compared to conventional polymer membranes into a nanofiltration membrane which may be used in an advanced water treatment process by having advantages of enabling a high membrane permeation flux to be maintained and being capable of removing up to low-molecular weight organic materials.

Meanwhile, the technical tasks to be achieved in the present disclosure are not limited to the technical tasks mentioned above, and other technical tasks that are not mentioned may clearly be understood by those skilled in the art to which the present disclosure pertains from the description below.

According to the present disclosure, a ceramic graphene oxide nanofiltration membrane with increased mechanical stability while maintaining ion removal ability of the existing graphene oxide membrane may be manufactured by stacking electrolytes of PEI and GO in the form of a covalent bond rather than electrostatic adsorption.

Further, according to the present disclosure, it is possible to manufacture a ceramic graphene oxide nanofiltration membrane capable of withstanding extreme environments such as semiconductor wastewater, etc. with strong physical properties by using a covalent bond having a strong bonding force rather than electrostatic adsorption or hydrogen bond.

Further, according to the present disclosure, since a cross-linker for bonding GO and PEI is not required, and thus the interlayer spacing may be kept small so that there is an advantageous effect in removing fine contaminants such as dissolved silica in semiconductor wastewater.

According to the present disclosure, it is possible to secure a domestic original technology for manufacturing ceramic nanomembranes.

However, the effects obtainable in the present disclosure are not limited to the above-mentioned effects, and another effects not mentioned will be able to be clearly understood by those skilled in the art to which the present disclosure pertains from the following description.

Figure 1:
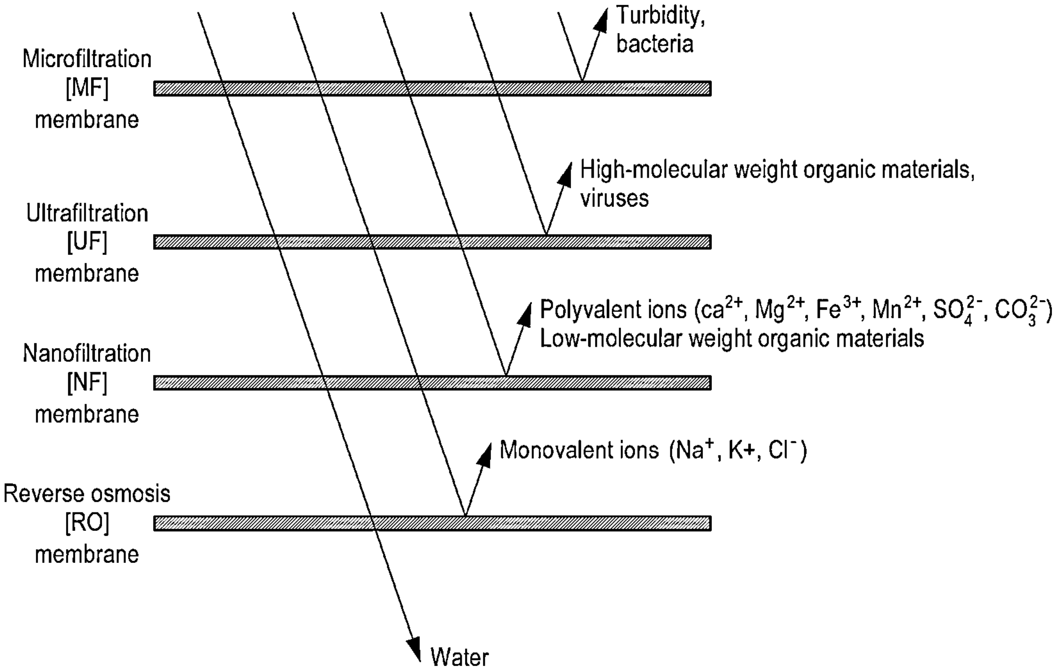
FIG. 1 is a diagram showing a microfiltration membrane, an ultrafiltration membrane, a nanofiltration membrane, and a reverse osmosis membrane separately depending on their functions.
Figure 2:
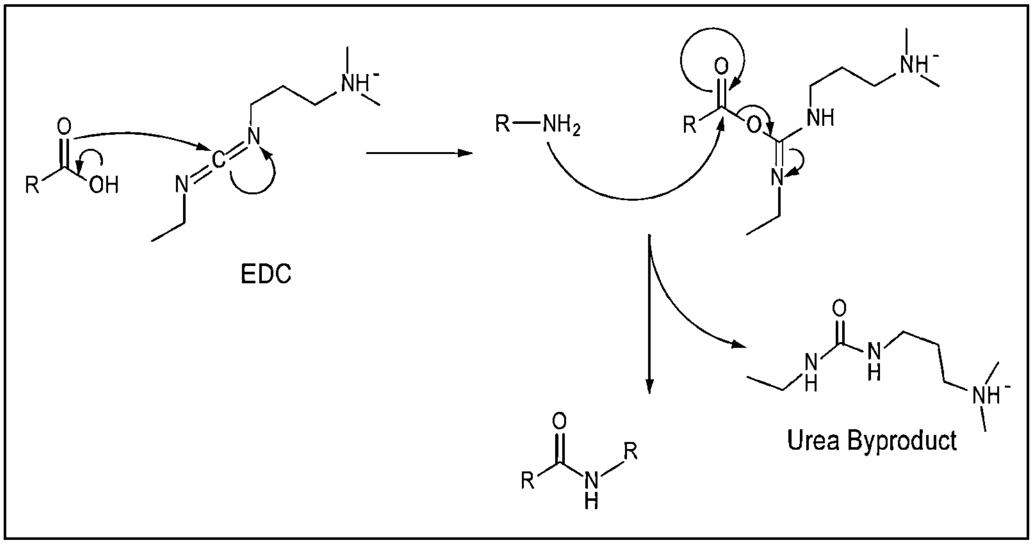
FIG. 2 is a diagram explaining that a carboxyl group (—COOH) and an amine group (—$NH_2$) may form an amide group (—CONH) by forming a covalent bond in the presence of EDC.

The significance of features and advantages of the present disclosure will be better understood with reference to the accompanying drawings. However, it should be understood that the drawings are devised for purposes of illustration only and do not define the limitations of the present disclosure.

DETAILED DESCRIPTION OF THE PREFERRED EMBODIMENT

Hereinafter, embodiments of the present disclosure will be described in detail with reference to the accompanying drawings so that those skilled in the art to which the present disclosure pertains may easily implement the present disclosure. However, since the description of the present disclosure is merely embodiments for structural or functional description, the scope of rights of the present disclosure should not be construed as being limited by the embodiments described in the text. That is, since the embodiments may be variously changed and may have various forms, it should be understood that the scope of rights of the present disclosure includes equivalents capable of realizing the technical idea. Further, since the object or effect presented in the present disclosure does not mean that a specific embodiment should include all of them or only such an effect, it should not be understood that the scope of rights of the present disclosure is limited thereby.

The meaning of the terms described in the present disclosure should be understood as follows.

Terms such as "first", "second", etc. are for distinguishing one element from other elements, and the scope of rights should not be limited by these terms. For example, a first element may be termed a second element, and similarly, the second element may also be termed the first element. When a component is referred to as being "connected" to other components, it may be directly connected to the other components, but it should be understood that another component may exist in the middle thereof. On the other hand, when it is mentioned that a certain component is "directly connected" to other component, it should be understood that another component does not exist in the middle thereof. Meanwhile, other expressions describing the relationship between components, that is, "between" and "directly between" or "neighboring to" and "directly adjacent to", etc., should also be interpreted similarly.

The singular expression should be understood as including the plural expression unless the context clearly dictates otherwise, it is intended to designate that a term such as "comprises", or "have", refers to the specified feature, number, step, operation, component, part, or a combination thereof exists, and it should be understood that it does not preclude the possibility of the existence or addition of one or more other features or numbers, steps, operations, components, parts, or combinations thereof in advance.

All terms used herein have the same meaning as commonly understood by those skilled in the art to which the present disclosure pertains, unless otherwise defined. Terms defined in generally used dictionaries should be interpreted as having the meaning consistent with that in the context of the related art, and may not be interpreted as having an ideal or excessively formal meaning unless explicitly defined in the present disclosure.

The inventors of the present disclosure used EDC chemistry in order to cross-coat GO and PEI on the surface of a ceramic membrane. The ceramic membrane may be made of a material such as titania, alumina, silica, or zirconia, and it is preferable to use a membrane containing a hydroxyl group in its surface as described above.

A method of cross-coating GO and PEI on the ceramic membrane surface using EDC chemistry is as follows.

First, (step 1) PEI is adsorbed on the surface of the ceramic membrane by immersing a ceramic membrane in a PEI solution.

The time for immersing the ceramic membrane in the PEI solution is preferably 6 to 24 hours, most preferably 12 hours. If it is 6 hours or less, there may be insufficient time for the material to be sufficiently adsorbed into the solution, and if it is 24 hours or more, there may be a problem in that the adsorbed material is resuspended.

The PEI solution may have a concentration of 1,000 to 2,000 mg/L. At this time, if it is 1,000 mg/L or less, a problem may occur that the material may not sufficiently contact on the support, and if it is 2,000 mg/L or more, an aggregation phenomenon between the solutes in the solution may occur.

Next (step 2), the PEI-adsorbed ceramic membrane is heated at high temperatures to immobilize PEI. The PEI-adsorbed ceramic membrane may be heated to a temperature of 60° C. to 100° C. At this time, when it is 60° C. or less, PEI may not be sufficiently immobilized on the membrane, and when it is a high temperature of 100° C. or more, the PEI structure may be deformed.

Next (step 3), an EDC solution is added to a GO solution, and the PEI-immobilized ceramic membrane is immersed in the GO solution so that a carboxyl group of GO and an amine group of PEI are covalently bonded in the presence of EDC to form an amide group.

The GO solution may have a concentration of 1,000 to 2,000 mg/L. At this time, if it is 1,000 mg/L or less, a problem may occur that the material may not sufficiently contact on the support, and if it is 2,000 mg/L or more, an aggregation phenomenon between the solutes in the solution may occur.

The EDC solution may have a concentration of 2 to 5 mmol/L. At this time, if it is 2 mmol/L or less, there may be a problem that the EDC molecule may not sufficiently promote an amidation reaction, and if it is 50 mmol/L or more, a problem of lengthening the reaction time may occur due to the production of urea by-products. It has been reported that no urea by-products were produced at an EDC concentration of 5 mmol/L.

The time for immersing the PEI-immobilized ceramic membrane in the GO solution is preferably 6 to 24 hours, most preferably 12 hours. If it is 6 hours or less, there may be insufficient time for the material to be sufficiently adsorbed into the solution, and if it is 24 hours or more, there may be a problem in that the adsorbed material is resuspended.

Figure 3:
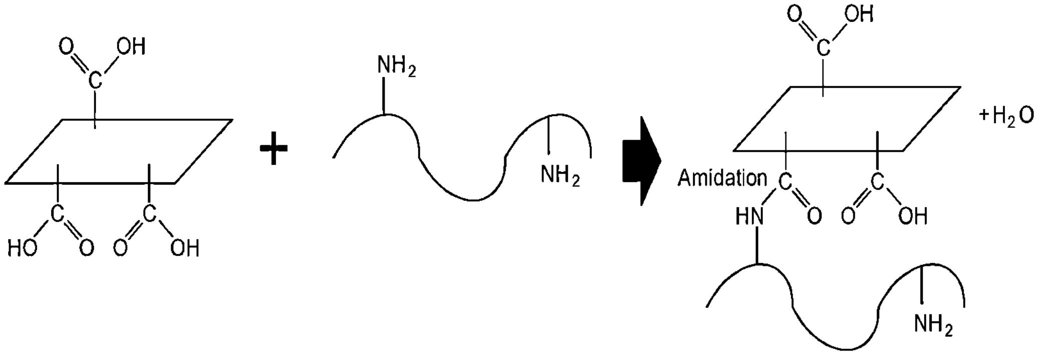
FIG. 3 is a diagram schematizing a process of coating polyethyleneimine (PEI) on a ceramic membrane according to an embodiment of the present disclosure.

(Step 4) The EDC solution is added to the PEI solution, and the ceramic membrane is immersed therein so that the carboxyl group of GO and the amine group of PEI are covalently bonded in the presence of EDC to form the amide group (see FIG. 3).

Figure 4:
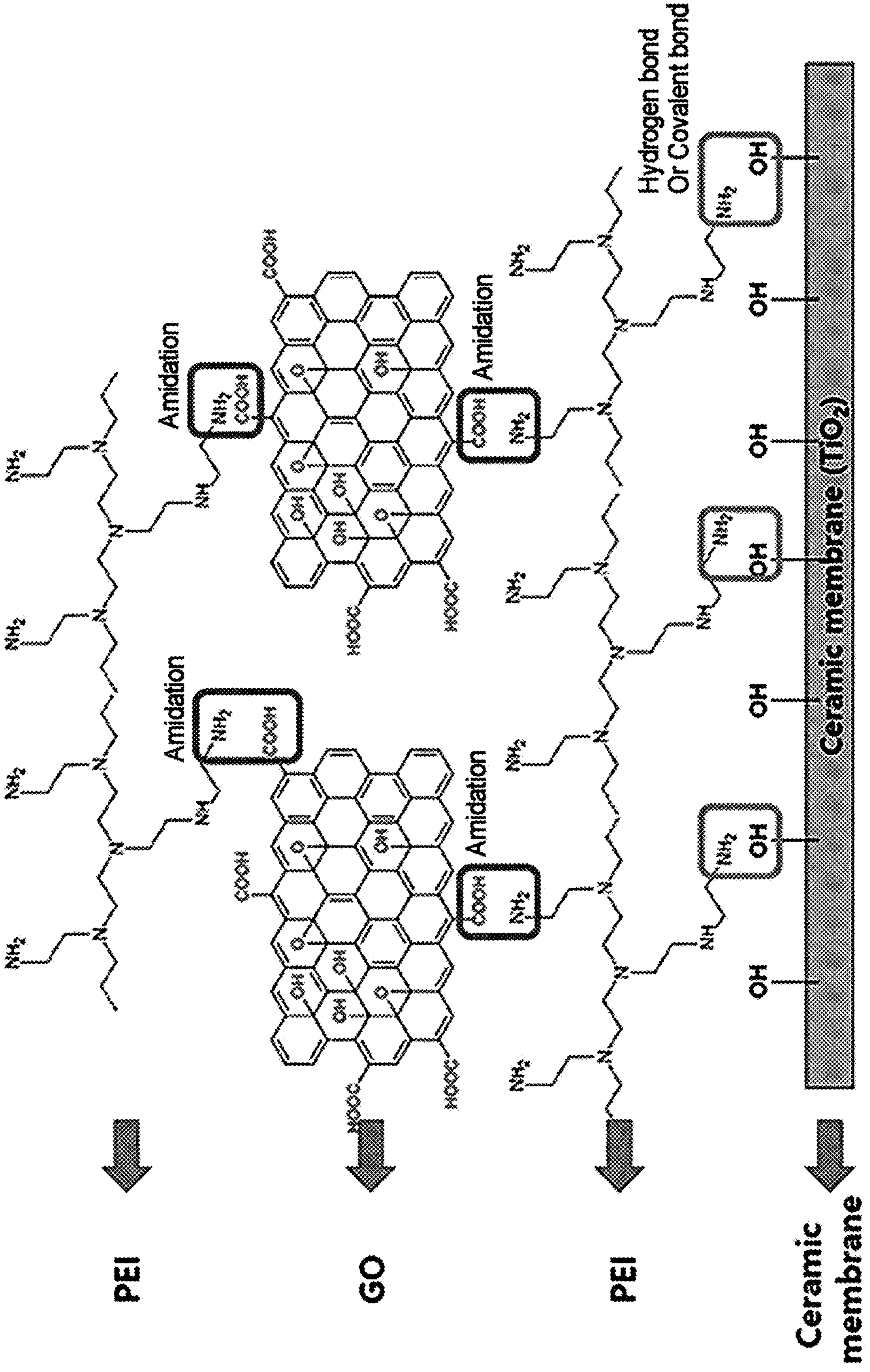
FIG. 4 is a diagram schematizing a ceramic membrane in which graphene oxide (GO) and PEI are cross-coated on the ceramic membrane according to the present disclosure.

(Step 5) A ceramic graphene oxide nanofiltration membrane is manufactured by repeating the steps 3 and 4 to laminate a GO/PEI multilayer thin film on the ceramic membrane (see FIG. 4).

EXAMPLE (Step 1) A ceramic membrane is immersed in a PEI solution (1,000 mg/L) for 1 hour to adsorb PEI on the ceramic membrane surface.

(Step 2) The PEI-adsorbed ceramic membrane is heated at a high temperature (105° C.) to immobilize PEI.

(Step 3) An EDC solution (4 mmol/L) is added to a GO solution (1,000 mg/L), and the PEI-immobilized ceramic membrane is immersed therein for 24 hours so that a carboxyl group of GO and an amine group of PEI are covalently bonded in the presence of EDC to form an amide group.

(Step 4) The EDC solution (4 mmol/L) is added to the PEI solution (1,000 mg/L), and the ceramic membrane is immersed therein for 24 hours so that the carboxyl group of GO and the amine group of PEI are covalently bonded in the presence of EDC to form the amide group.

(Step 5) A ceramic graphene oxide nanofiltration membrane is manufactured by repeating the steps 3 and 4 to laminate a GO/PEI multilayer thin film on the ceramic membrane.

What is claimed is:

1. A method for manufacturing a GO/PEI coated ceramic nanofiltration membrane having a pore size of 1 to 10 nm for use in a semiconductor wastewater treatment process, comprising:

a step 1 of immersing a ceramic nanofiltration membrane in a polyethyleneimine (PEI) solution for 12 hours to adsorb PEI on the surface of the ceramic nanofiltration membrane, wherein the concentration of PEI solution is sufficient to contact the membrane without causing aggregation of solute, wherein the concentration is 1000 to 2000 mg/L, and the ceramic nanofiltration membrane is made of titania having a hydroxyl group in its surface;

a step 2 of heating the PEI-adsorbed ceramic nanofiltration membrane at a temperature sufficient to immobilize the PEI on the membrane surface without deforming the membrane, wherein the temperature is 60-100° C. to form a hydrogen bond or covalent bond between the hydroxyl group(s) of the membrane surface and an amine group of PEI;

a step 3 of adding an N-ethyl-N'-[3-(dimethylamino) propyl]carbodiimide hydrochloride (EDC) solution to a graphene oxide (GO) solution and immersing the PEI-immobilized ceramic nanofiltration membrane in the EDC/GO mixed solution for 12 hours so that GO and PEI have covalently bonded in the presence of EDC via a carboxyl group (—COOH) of GO and an amine group (—$NH_2$) of PEI to form an amide (—CONH) linkage without requiring a crosslinker, wherein the concentration of GO solution is 1000 to 2000 mg/L, and the concentration of EDC present in the EDC/GO mixed solution is in the range of 2 to 5 mmol/L and does not produce urea by-products;

a step 4 of adding the EDC solution to the PEI solution and immersing the ceramic nanofiltration membrane therein so that GO and PEI have covalently bonded in the presence of EDC via a carboxyl group of GO and an amine group of PEI to form an amide linkage without requiring a crosslinker;

and a step 5 of repeating the steps 3 and 4 to laminate a GO/PEI multilayer thin film on the ceramic nanofiltration membrane by a layer-by-layer assembly.

2. A GO/PEI coated titania ceramic nanofiltration membrane having a pore size of 1 to 10 nm for use in a semiconductor wastewater treatment process, manufactured by the method for manufacturing the GO/PEI coated ceramic nanofiltration membrane according to claim 1.

* * * * *